United States Patent
Dutta

(10) Patent No.: US 8,974,695 B2
(45) Date of Patent: Mar. 10, 2015

(54) PHOSPHORS OF RARE EARTH AND TRANSITION METAL DOPED $Ca_{1+x}Sr_{1-x}Ga_yIn_{2-y}S_zSe_{3-z}F_2$; MANUFACTURING AND APPLICATIONS

(75) Inventor: Partha S. Dutta, Clifton Park, NY (US)

(73) Assignee: Auterra, Inc., Schenectady, NY (US)

(*) Notice: Subject to any disclaimer, the term of this patent is extended or adjusted under 35 U.S.C. 154(b) by 740 days.

(21) Appl. No.: 13/293,581

(22) Filed: Nov. 10, 2011

(65) Prior Publication Data

US 2012/0119145 A1    May 17, 2012

Related U.S. Application Data

(60) Provisional application No. 61/412,650, filed on Nov. 11, 2010.

(51) Int. Cl.
| | | |
|---|---|---|
| C09K 11/61 | (2006.01) | |
| C09K 11/56 | (2006.01) | |
| C09K 11/88 | (2006.01) | |
| C09K 11/62 | (2006.01) | |
| H05B 33/14 | (2006.01) | |

(52) U.S. Cl.
CPC .............. C09K 11/886 (2013.01); H05B 33/14 (2013.01)
USPC .............................. 252/301.4 S; 252/301.4 H

(58) Field of Classification Search
USPC ..................................... 252/301.4 S, 301.4 H
See application file for complete search history.

(56) References Cited

U.S. PATENT DOCUMENTS

| | | |
|---|---|---|
| 6,417,019 B1 | 7/2002 | Mueller et al. |
| 6,555,958 B1 | 4/2003 | Srivastava et al. |
| 6,911,129 B1 | 6/2005 | Li |
| 7,109,648 B2 | 9/2006 | Menkara et al. |
| 7,229,573 B2 | 6/2007 | Setlur et al. |
| 7,267,787 B2 | 9/2007 | Dong et al. |
| 7,311,858 B2 | 12/2007 | Wang et al. |
| 7,501,753 B2 | 3/2009 | Haneu et al. |
| 8,703,015 B2 * | 4/2014 | Chen et al. ............ 252/301.4 H |
| 2004/0219116 A1 * | 11/2004 | Reynders et al. ............... 424/63 |
| 2005/0023546 A1 | 2/2005 | Menkara et al. |
| 2005/0023963 A1 | 2/2005 | Menkara et al. |
| 2010/0151249 A1 | 6/2010 | Weimer et al. |
| 2012/0119145 A1 | 5/2012 | Dutta |

OTHER PUBLICATIONS

Application No. PCT/US2012/63825, International Search Report and the Written Opinion of the International Searching Authority, or the Declaration dated Jan. 31, 2013. 8 pages.
U.S. Department of Energy website, http://www.netl.doe.gov.ssl/.

(Continued)

Primary Examiner — Carol M Koslow
(74) Attorney, Agent, or Firm — Schmeiser, Olsen & Watts, LLP

(57) ABSTRACT

Energy down conversion phosphors represented by the chemical formula $Ca_{1+x}Sr_{1-x}Ga_yIn_{2-y}S_zSe_{3-z}F_2$ where ($0 \leq x \leq 1$, $0 \leq y \leq 2$, $0 \leq z \leq 3$) doped with rare earth and/or transition metal elements is disclosed. Dopant impurities may be one or more species such as Eu, Ce, Mn, Ru, and/or mixtures thereof present as activators. The molar fractions x, y and z, the dopant species and the dopant concentration may be varied to tune the peak emission wavelength and/or the width of the emission peak.

13 Claims, 6 Drawing Sheets

Photoluminescence (PL) spectra of $Eu^{2+}$ doped $CaSrGa_2SSe_2F_2$ (solid curve) and $Eu^{2+}$ doped $Ca_2Ga_2SSe_2F_2$ (dashed curve.

(56) References Cited

OTHER PUBLICATIONS

Mukai, Takashi; Yamada, Motokazu ; and Nakamura, Shuji; "Characteristics of InGaN-Based UV/Blue/Green/Amber/Red Light-Emitting Diodes," Jpn. J. Appl. Phys., vol. 38 (1999) pp. 3976-3981, 6 pages.

Mueller-Mach, Regina; Mueller, Gerd O.; Trottier, Troy; Krames, Michael R.; Kim, Andy; and Steigerwald, Dan; "Green Phosphor-Converted LED," Proc. SPIE. 4776 (2002), pp. 131-136, 6 pages.

Xie, Rong-Jun; Hirosaki, Naoto; Sakuma, Ken; Yamamoto, Yoshinobu; and Mitomo, Mamoru; "$Eu^{2+}$-doped Ca-α-SiAlON: A yellow phosphor for white light-emitting diodes", Appl. Phy. Lett., vol. 84 (2004), p. 5404, 3 pages.

Jang, Ho Seong; Im, Won Bin; Lee, Dong Chin; Jeon, Duk Young; and Kim, Shi Surk; "Enhancement of red spectral emission intensity of $Y_3Al_5O_{12}:Ce^{3+}$ phosphor via Pr co-doping and Tb substitution for the application to white LEDs," J. Lumine. vol. 126 (2007) pp. 371-377, 7 pages.

Piao, Xianqing; Machida, Ken-ichi; Horikawa, Takashi; Hanzawa, Hiromasa; Shimomura, Yasuo; and Kijima, Naoto; "Preparation of $CaAlSiN_3:Eu^{2+}$ Phosphors by the Self-Propagating High-Temperature Synthesis and Their Luminescent Properties," Chem. Mater., vol. 19 (2007), pp. 4592-4599, 8 pages.

Park, Joung Kyu; Lim, Mi Ae; Kim, Chang Hae; and Park, Hee Dong; "White light-emitting diodes of GaN-based $Sr_2SiO_4$ : Eu and the luminescent properties," Appl. Phys. Lett., vol. 82 (2003) p. 683, 3 pages.

Park, Joung Kyu; Kim, Chang Hae; Park, Seung Hyok; Park, Hee Dong; and Choi, Se Young; "Application of strontium silicate yellow phosphor for white light-emitting diodes" Appl. Phys. Lett., vol. 84 (2004), p. 1647, 3 pages.

Im, Won Bin; Kim, Young-Il; Fellows, Natalie N.; Masui, Hisashi; Hirata, G. A.; DenBaars, Steven P.; and Seshadri, Ram; "A yellow-emitting $Ce^{3+}$ phosphor, $La_{1-x}Ce_xSr_2AlO_5$, for white light-emitting diodes," Appl. Phys. Lett., vol. 93 (2008) p. 091905, 3 pages.

Saradhi, M. Pardha and Varadaraju, U. V.; "Photoluminescence Studies on $Eu^{2+}$—Activated $Li_2SrSiO_4$—a Potential Orange-Yellow Phosphor for Solid-State Lighting," Chem. Mater., vol. 18 (2006) p. 5267, 6 pages.

Li, Y. Q.; Delsing, A. C. A.; de With, G.; and Hintzen, H. T.; "Luminescence Properties of $Eu^{2+}$-Activated Alkaline-Earth Silicon-Oxynitride $MSi_2O_2$-$\delta N_{2+2/3\delta}$ (M=Ca, Sr, Ba): A Promising Class of Novel LED Conversion Phosphors," Chem. Mater., vol. 17 (2005), p. 3242, 7 pages.

Xie, Rong-Jun; Hirosaki, Naoto; Mitomo, Mamoru; Takahashi, Kosei; and Sakuma, Ken; "Highly efficient white-light-emitting diodes fabricated with short-wavelength yellow oxynitride phosphors," Appl. Phys. Lett., vol. 88 (2006), p. 101104, 3 pages.

Wu, Hao; Zhang, Xinmin; Guo, Chongfeng; Xu, Jian; Wu, Mingmei; and Su, Qiang; "Three-Band White Light From InGaN-Based Blue LED Chip Precoated with Green/Red Phosphors," IEEE Photon. Tech. Lett., vol. 17 (2005) p. 6, 3 pages.

Mueller-Mach, Regina; Mueller, Gerd O.; Schmidt, Peter J.; Wiechert, Detlef U.; and Meyer, Joerg; "Nitridosilicates, a new family of phosphors for color conversion of LEDs," Proc. of SPIE, vol. 5941 (2005), p. 59410Z-1, 8 pages.

Hidaka, Chiharu; Makabe, Nobuyasu; and Takizawa, Takeo; "Determination of a pseudo-binary $SrSe-Ga_2Se_3$ phase diagram and a single crystal growth of $SrGa_2Se_4$ compounds," J. of Phys. and Chem. Solids, vol. 64 (2003), pp. 1797-1800, 4 pages.

Zhang, Xinmin; Liang, Lifang; Zhang, Jianhui; and Su, Qiang; "Luminescence properties of $(Ca_{1-x}Sr_x)Se:Eu^{2+}$ phosphors for white LEDs application," Materials Lett., vol. 59 (2005) pp. 749-753, 5 pages.

Donohue, P. C. and Hanlon, J. E.; "The Synthesis and Photoluminescence of $MIIM2III(S,Se)4$," J. Electrochem. Soc. Solid State Science and Technology, vol. 121 (1) (1974), pp. 137-142, 6 pages.

Charter, Céline; Jabarov, Rasim; Jouanne, Michel; Morhange, Jean-François; Benalloul, Paul; Barthou, Carlos; Frigerio, Jean-Marc; Tagiev, Bahadur; and Gambarov, Eldar; "Raman investigation of orthorhombic $MIIGa_2(S,Se)_4$ compounds," J. Phys.: Condens. Matter, vol. 14 (2002) pp. 13693-13703, 11 pages.

Zhang, Jianhui; Wang, Jing; Yu, Ruijin; Yuan, Haibin; and Su, Qiang; "Luminescence properties of $Ca_{1-x}Sr_xSe:Ce$ phosphors and their potential application for GaN-based LEDs," Materials Research Bulletin, vol. 44 (2009), pp. 1093-1096, 4 pages.

* cited by examiner

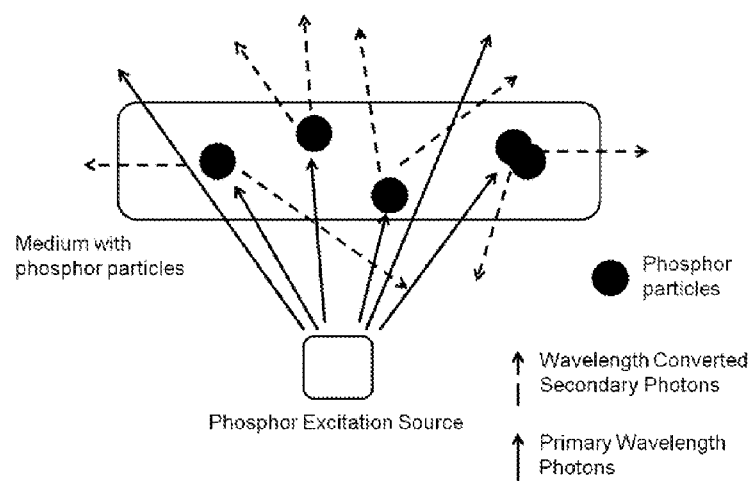
Figure 1. Schematic of a luminescent structure such as a PC-LED fabricated using phosphor particles.

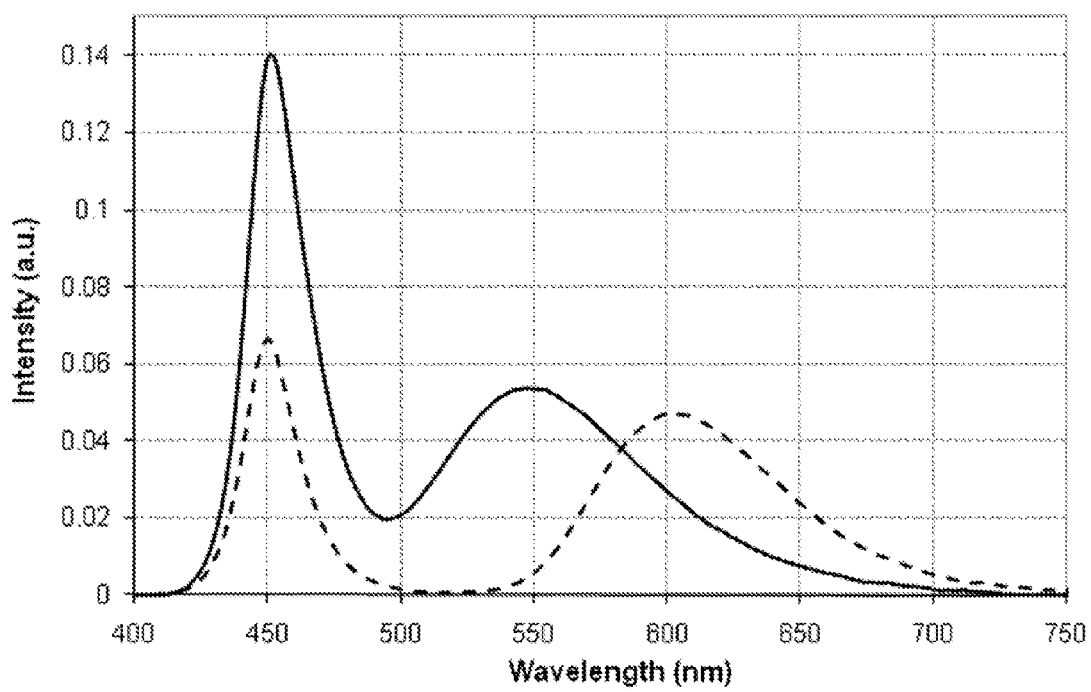
Figure 2a. Photoluminescence (PL) spectra of $Eu^{2+}$ doped $CaSrGa_2SSe_2F_2$ (solid curve) and $Eu^{2+}$ doped $Ca_2Ga_2SSe_2F_2$ (dashed curve.

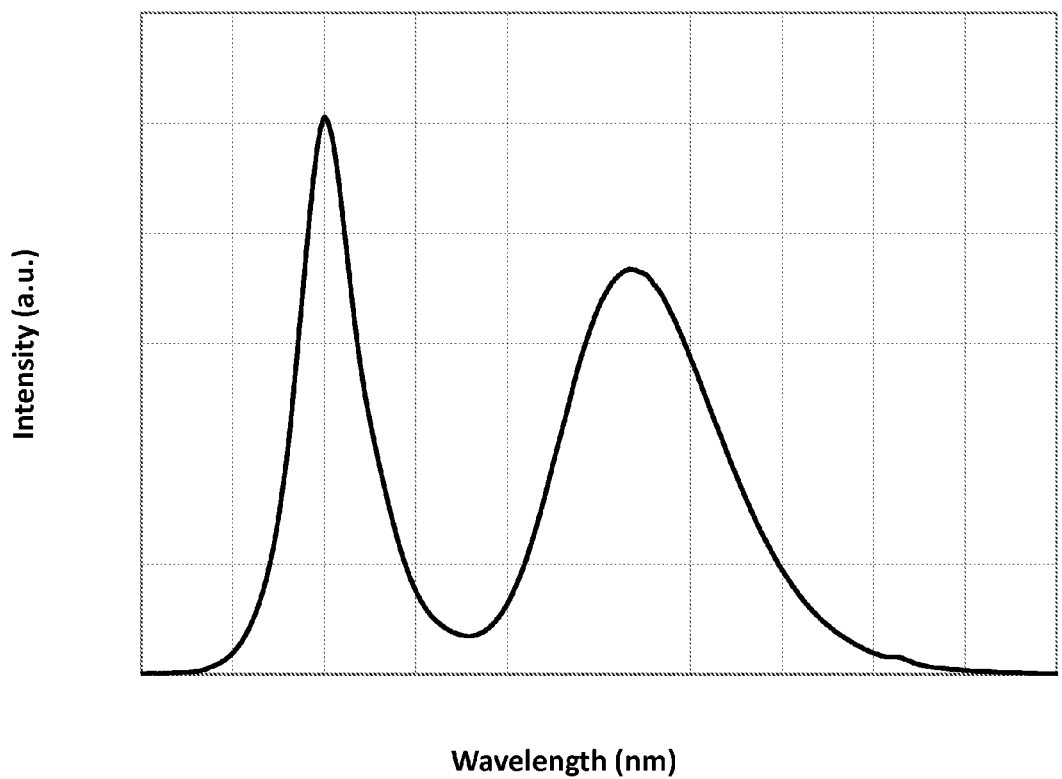
Figure 2b. Photoluminescence (PL) spectra of $Eu^{2-}$ doped $CaSrGa_2S_3F_2$.

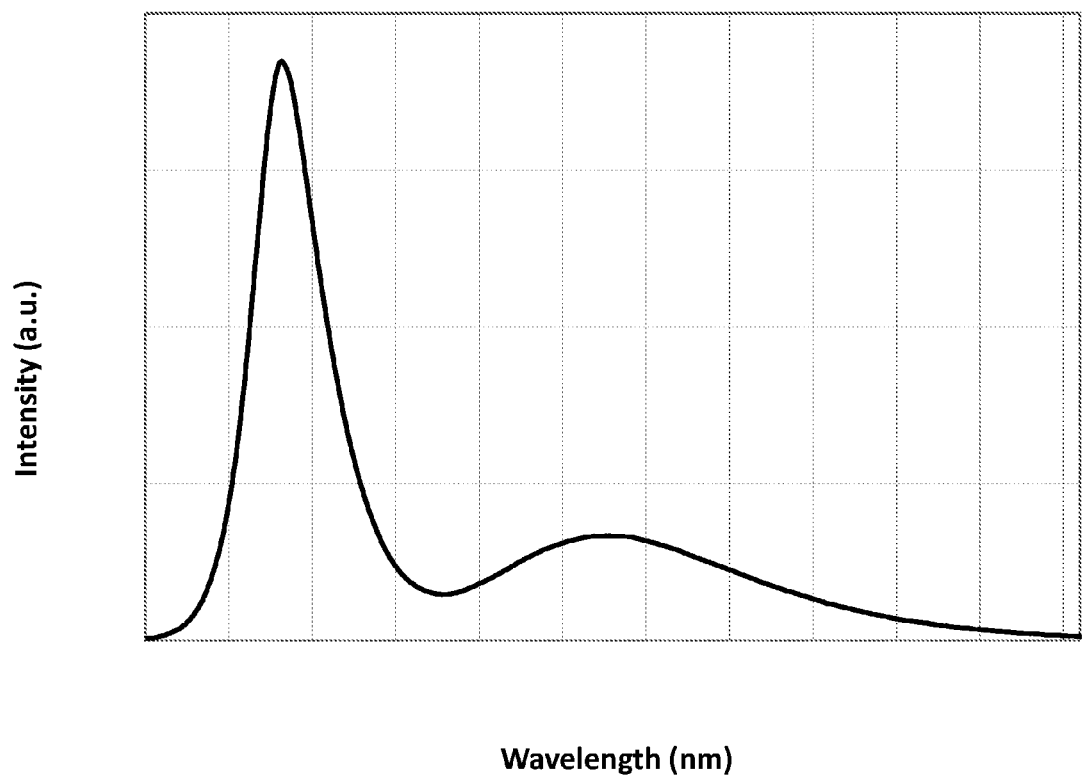
Figure 2c. Photoluminescence (PL) spectra of $Eu^{2+}$ doped $Ca_{1.5}Sr_{0.5}Ga_2S_3F_2$.

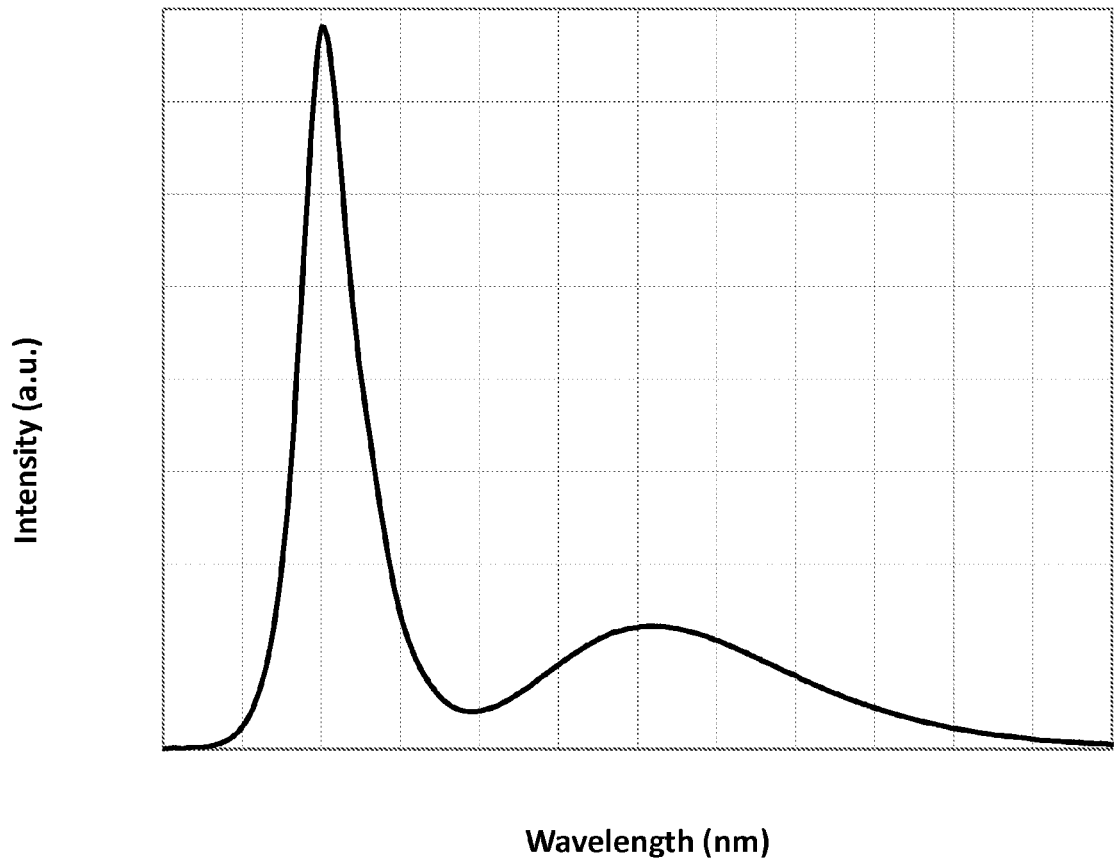
Figure 2d. Photoluminescence (PL) spectra of $Eu^{2+}$ doped $Ca_2Ga_2S_3F_2$.

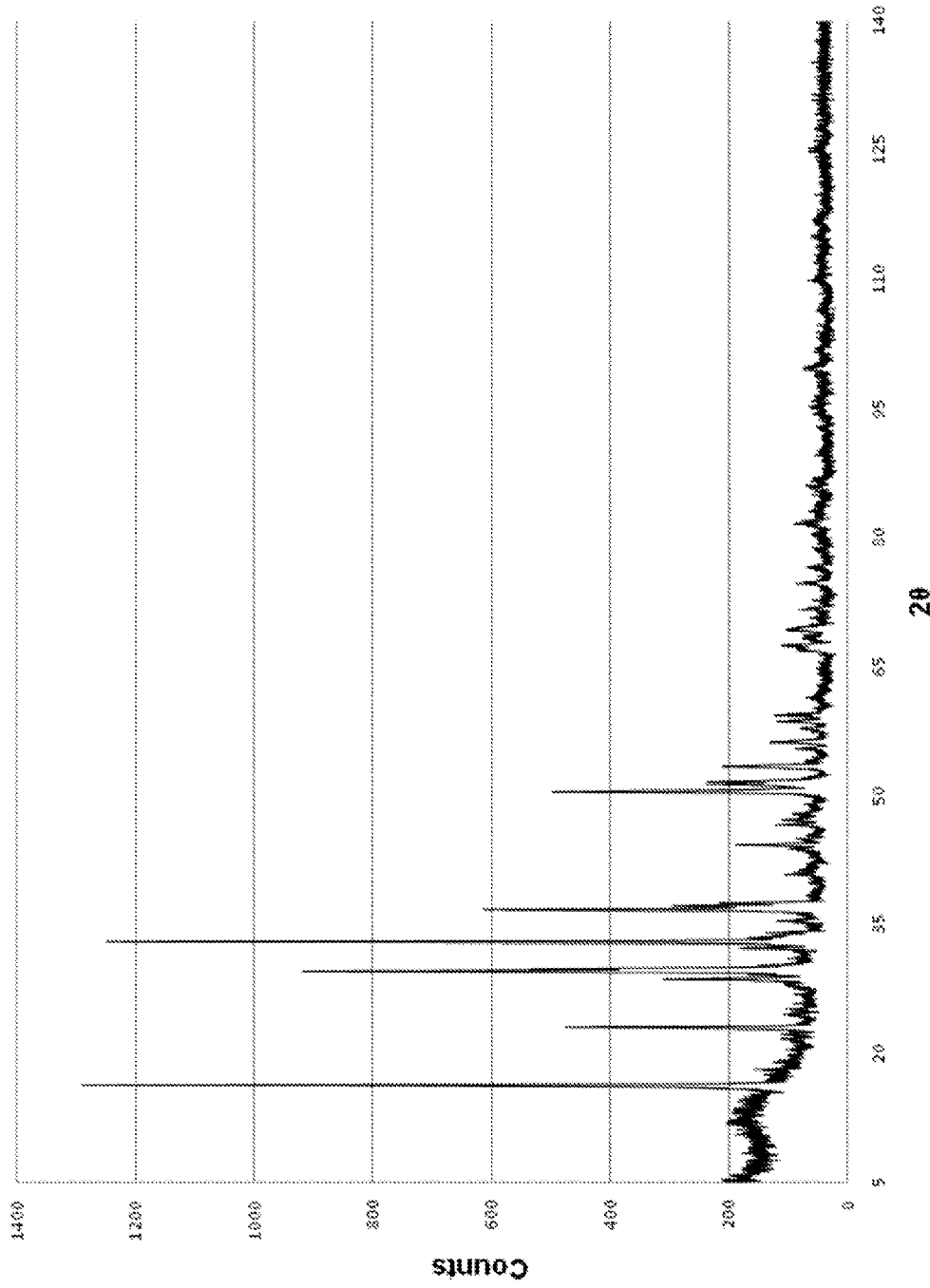
Figure 3. Powder x-ray diffraction curve of $Eu^{2+}$ doped $CaSrGa_2SSe_2F_2$

PHOSPHORS OF RARE EARTH AND TRANSITION METAL DOPED $CA_{1+x}SR_{1-x}GA_yIN_{2-y}S_zSE_{3-z}F_2$; MANUFACTURING AND APPLICATIONS

This application is a non-provisional patent application of the earlier provisional patent application entitled "Phosphors of rare earth and transition metal doped $Ca_{1+x}Sr_{1-x}Ga_y In_{2-y}S_zSe_{3-z}F_2$; methods of manufacturing and applications," Ser. No. 61/412,650, filed Nov. 11, 2010 now pending, the disclosures of which are hereby incorporated herein by reference.

BACKGROUND

The present invention is directed to rare earth and/or transition metal doped $Ca_{1+x}Sr_{1-x}Ga_yIn_{2-y}S_zSe_{3-z}F_2$ ($0 \leq x \leq 1$, $0 \leq y \leq 2$, $0 \leq z \leq 3$) compounds that may be used for photon energy down conversion applications and the synthesis thereof.

Solid state lighting (SSL) technologies based on light emitting diodes (LEDs) are promising for a number of applications including general illumination, displays, medical systems, communication systems, etc. Significant growth in the SSL industry will be based on the availability of high efficiency, high power white LEDs. Currently available commercial white LEDs especially for warm white are not quite satisfactory for most general illumination applications. Their overall light output, luminous efficacy, color properties, and life must improve and the cost must be reduced before white LEDs can experience widespread usage in general lighting applications. Two popular methods for creating white light sources are (a) using phosphor based wavelength conversion structures and (b) using mixed color LEDs (red, blue and green referred to as RGB). Both these methods have their own advantages. The RGB based white LEDs offers the capability to tune colors in real time and better color properties in display applications. On the other hand, RGB white light LED systems require sophisticated active feedback control to keep the light at a stable color because the red, green and blue LEDs are created from different semiconductor materials. Currently the overall efficiency of RGB lighting system is low mainly due to low quantum efficiency of gallium indium nitride ($Ga_{1-x}In_xN$) direct emission green LEDs with peak emission wavelength near 555 nm (the peak of the human eye sensitivity). This is referred to as the "green gap" in the industry. To achieve high luminous efficacy for mixed color LEDs, the external quantum efficiency (EQE) of green LEDs needs to improve significantly. However, there are fundamental material challenges due to which high EQE for epitaxially grown $Ga_{1-x}In_xN$ based direct emission green LEDs has not been achieved to-date. Phosphor-converted white light-emitting diodes (PC-LED) are rapidly progressing to meet the solid-state lighting goals of 200 lumens per watt (lm/W) by 2020 set by the United States Department of Energy (U.S. DOE). Presently available commercial white LEDs are delivering about 100 lumens per watt. However to reach 200 μm/W, significant improvements are needed at several stages, including internal quantum efficiency, extraction efficiency from the chip, and phosphor system efficiency, which includes phosphor conversion efficiency and extraction efficiency at the LED package level. Hybrid approaches for white light sources are also potential for general illumination purposes. In this approach, LEDs of individual wavelengths (red, blue, green, yellow, amber, etc.) with highest efficiencies are integrated into a system to provide color mixing. The individual wavelength LEDs may be either direct emission LEDs or PC-LEDs. In this regard, higher efficiency PC-LEDs for green emission wavelengths (in the green-gap) are better suited than the low efficiency direct emission green LEDs.

For display applications such as the Liquid Crystal Displays (LCD), LED based backlighting are anticipated to provide superior color gamut compared to the existing cold cathode fluorescent lamp (CCFL). Numerous benefits for LED backlighting lighting for LCD displays include: no mercury, much longer source life, greater than 30,000 hours, compared to CCFL, less prone to breaking. However, presently LED based displays are less energy efficient and higher in cost compared to CCFL based displays. Apart from the traditional general illumination and display technologies, there is a vast commercial market for LED based light sources with different emission wavelengths. Applications in biotechnology, indoor agriculture, photo-chemical reactions, adaptive illumination, photo-therapy, data communication, etc. are just a few examples.

For solid state light sources to be feasible for large scale deployment, there are few criteria that needs to be satisfied: higher wall plug efficiencies, low cost, availability of light sources with a variety of spectral content, ease of manufacturing and integration within systems, etc. Availability of light sources with any desirable peak emission wavelengths across the visible light spectrum will be necessary for a multitude of future applications. While direct emission LEDs based on semiconductor p-n junction diodes are available for discrete wavelengths, developing the technologies for high efficiency devices for a large number of emission wavelengths is not feasible. For direct emission LED development for any new emission wavelength, long term (5-10 years) and huge investments are necessary. In addition, integration and active control of large number of direct emission LEDs in a high efficacy light source is problematic and would be cost prohibitive as well as consume higher power during operation. PC-LEDs are attractive proposition since development of high efficiency phosphors of various emission wavelengths can be done simultaneously (short time period) with relatively low investments. Using the blue or ultraviolet (UV) direct emission $Ga_{1-x}In_xN$ and $Al_{1-x}Ga_xN$ LEDs as excitation source for phosphors, PC-LEDs with large number of emission wavelengths may be developed. PC-LEDs also offer tremendous opportunities due to their simplicity and lower cost of fabrication, tunable and wide spectral characteristics, low power consumption and ease of operation, etc. Due to these reasons, intense research is being conducted worldwide in the area of down conversion phosphors that may be excited by blue LEDs.

High efficiency phosphors compounds have been studied extensively and sufficiently developed for UV excitation such as used in existing CFL (compact fluorescent lamp), CRT (cathode ray tube), CCFL (cold cathode fluorescent lamp), etc. However these phosphors have poor absorption and wavelength conversion efficiencies for excitation sources in the blue region of the visible spectrum (400-480 nm). Current research in new phosphor compounds is targeted towards the development of materials that possess high absorption coefficient for blue wavelengths and high quantum efficiencies for converting blue to longer wavelength photons. Rigorous search for high efficiency phosphor materials and unique composition of matter continues at the present time. Some of the high efficiency phosphor compounds found to-date are discussed below.

Phosphor-converted white LEDs are commonly achieved by using a yellow phosphor with a blue LED or by using red, green, blue (RGB) phosphors with a UV LED. One of the most popular yellow phosphors presently used in commercial white LEDs is $Y_3Al_5O_{12}:Ce^{3+}$ (YAG:Ce). Since the successful development of $Ga_{1-x}In_xN$ blue LEDs, researchers have investigated four broad categories of high efficiency phosphors for white LED applications with various degrees of success. These high phosphors falls in the following categories: (i) metal oxides, (ii) metal sulfides, selenides and thiogallates, (iii) metal nitrides and (iv) metal oxo-nitrides. Some of these high efficiency blue wavelength excitable phosphors with emission peak tunable across the visible spectrum are already being used in white LED fabrication. The chemical compositions of these phosphors are listed below:

Yttrium aluminum garnet family: $(Y_xGd_{1-x})_3(Al_yGa_{1-y})_5O_{12}$: $Ce^{3+}$, $Pr^{3+}$ with $0<x<1$.

Silicate garnet family: $ML_2QR_4O_{12}$: $Ce^{3+}$, $Eu^{3+}$. Here M is elements from the group IIA (Mg, Ca, Sr, Ba). L is rare earth elements from the group consisting of Sc, Y, La, Ce, Pr, Nd, Pm, Sm, Eu, Gd, Tb, Dy, Ho, Er, Tm, Yb and Lu. Q is elements from the group IVA (Si, Ge, Sn, Pb). R is elements from the group IIIA (B, Al, Ga, In, Tl).

Vanadate garnet family: $Ca_2NaMg_2V_3O_{12}$: $Eu^{3+}$.

Mixed oxides family: $(Y_{2-x-y}Eu_xBi_y)O_3$: $Eu^{3+}$, $Na_2Gd_2B_2O_7$: $Ce^{3+}$, $Tb^{3+}$, $YCa_3M_3B_4O_{15}$: $Eu^{3+}$ where M is elements from group IIIA (Al, Ga, In), $LaCeSr_2AlO_5$:$Ce^{3+}$, $Ba_2Al_2O_4$:$Eu^{2+}$.

Alkaline earth metal silicates family: $(Ba_{1-x-y}Sr_xCa_y)SiO_4$:$Eu^{2+}$ series such as $Ca_3MgSi_2O_8$: $Eu^{2+}$, $Sr_3MgSi_2O_8$: $Eu^{2+}$, $Ba_3MgSi_2O_8$: $Eu^{2+}$, and their mixtures; $Ba_2MgZnSi_2O_4$:$Eu^{2+}$, $Sr_3SiO_5$:$Eu^{2+}$, $Li_2SrSiO_4$:$Eu^{2+}$, and $A_2SiO_4$: $Eu^{2+}$, D where A is elements from group II (Sr, Ba, Ca, Zn, Cd, Mg) and D is elements such as F, Cl, Br, I, N, S, P.

Alkaline earth metal sulfides and selenides, MS: $Eu^{2+}$ and MSe: $Eu^{2+}$. Here M is elements from group IIA (Mg, Ca, Sr, Ba) such as $Ca_{1-x}Sr_xS$:$Eu^{2+}$, $Ca_{1-x}Sr_xS_ySe_{1-y}$:$Eu^{2+}$ with $0<x<1$ and $0, y<1$.

Alkaline earth metal thiogallates: metal sulfide thiogallates such as $(SrMgCaBa)(GaAlIn)_2S_4$:$Eu^{2+}$ and metal sulfo-selenide thiogallates such as $MA_2(S_xSe_y)_4$:B; $MA_4(S_xSe_y)_7$:B; $M_2A_4(S_xSe_y)_7$:B; $(M1)_m(M2)_nA_p(S_xSe_y)_q$; where M=Be, Mg, Ca, Sr, Ba, Zn; M1=Be, Mg, Ca, Sr, Ba, Zn; M2=Be, Mg, Ca, Sr, Ba, Zn; A=Al, Ga, In, Y, La, Gd; B=Eu, Ce, Cu, Ag, Al, Tb, Cl, Br, F, I, Mg, Pr, K, Na, Mn. The range of compositions covered for high efficiency sulfo-selenide thiogallate phosphors are as follows: m=0 to 1; n=0 to 1; m+n=1 (close to 1); p=close to 2 or close to 4; q=close to 4 or close to 7; when p=close to 2, q=close to 4; when p=close to 4, q=close to 7; x=0 to 1; y=0 to 1; x+y=0.75 to 1.25; x+y=0.5 to 1.5; B=0.0001 to 10 mole %.

Metal nitrides family: $M_xSi_yN_z$:$Eu^{2+}$, $Ce^{3+}$ where M=Mg, Ca, Sr, Ba, Ln, Y, Yb, Al such as $Sr_2Si_5N_8$:$Eu^{2+}$, $Ba_2Si_5N_8$:$Eu^{2+}$, $(Sr_{1-x-y}Ba_xCa_y)_2Si_5N_8$:$Eu^{2+}$, $CaAlSiN_3$:$Eu^{2+}$, $Ca_xAl_ySi_zN_3$:$Ce^{3+}$, $CaSiN_2$:$Ce^{3+}$.

Metal oxo-nitrides family: $MSi_2O_2N_2$:$Eu^{2+}$ where M=Ba, Sr, Ca, etc., $(SrCa)_{p/2}Al_{p+q}Si_{12-p-q}O_qN_{16-q}$:$Eu^{2+}$, $(Ca_xM_y)(Si,Al)_{12}(O,N)_{16}$:$Eu^{2+}$ where M=Eu, Tb, Yb, Er group element, $Li_xM_yLn_zSi_{12-(m+n)}Al_{(m+n)}O_nN_{16-n}$:$Eu^{2+}$ where M=Ca, Mg, Y and Ln=Eu, Dy, Er, Tb, Yb, Ce, $SrSiAl_2O_3N_2$: $Eu^{2+}$.

According to the US Department of Energy (DOE) roadmap for phosphor development targets for 2015, quantum yield of 90% across the entire visible spectrum, color uniformity, color stability, thermal sensitivity and reduced optical scattering require the search for new phosphor materials and/or fine tuning the compositions of known phosphors. Therefore, it is the object of the present invention to synthesize selective crystalline phases of various alloy systems that have higher quantum conversion efficiencies and performance characteristics suitable for device fabrication and operation.

It is a further object of the present invention to provide new alloy compositions that have been demonstrated to yield high wall plug efficiency and high efficacy light sources.

BRIEF DESCRIPTION OF THE DRAWINGS

The disclosure itself will be best understood by reference to the following detailed description of illustrative embodiments when read in conjunction with the accompanying drawings, wherein:

FIG. 1 shows a typical PC-LED structure excited by a blue or UV LED.

FIG. 2a shows the PL spectrum of the phosphor (solid curve) in Example 1 and (dashed curve) in Example 2.

FIG. 2b shows the PL spectrum of the phosphor in Example 3.

FIG. 2c shows the PL spectrum of the phosphor in Example 4.

FIG. 2d shows the PL spectrum of the phosphor in Example 5.

FIG. 3 shows the powder XRD of the phosphor in Example 1.

SUMMARY OF THE INVENTION

The present invention provides a composition of matter $Ca_{1+x}Sr_{1-x}Ga_yIn_{2-y}S_zSe_{3-z}F_2$: D wherein $0\le x<1$, $0\le y\le 2$ and $0\le z\le 3$ and further wherein D is one or more rare earth and/or transition metal impurities selected from the group consisting of Eu, Ce, Pr, Tb, Ru, Er, Mn and/or mixtures thereof. The composition of matter of the present invention may be incorporated as an active element or as a passive element for applications including, but not limited to, electrical, mechanical, magnetic, optical, thermal, chemical, electronic, optoelectronic, photonic, power generation, bio-chemical, and cosmetic applications. Suitable uses for the composition of matter of the present invention include, but are not limited to, use as a solid substrate, a thin film, a colloidal solution, a light emission device, a light detection device, a power generation device, a wavelength conversion device, an optical filter, a light carrier (waveguide or fiber), a printing ink, a paint, a light modulator device, an optical switch, a reflective surface, a catalyst, a photo-therapy device, a photo-bio-reactor, a chemical reactor, a bio-chemical reactor, a laser gain medium, a photo-transistor, and/or a fluorescent tag.

The present invention further provides a synthesis method for a composition of matter $Ca_{1+x}Sr_{1-x}Ga_yIn_{2-y}S_zSe_{3-z}F_2$: D wherein $0\le x\le 1$, $0\le y\le 2$ and $0\le z\le 3$ and further wherein D is one or more rare earth and/or transition metal impurities selected from the group consisting of Eu, Ce, Pr, Tb, Ru, Er, Mn and/or mixtures thereof comprising the steps of: (a) liquid phase reaction, (b) grinding and homogenization of alloyed ingredients, and (c) solid phase reaction.

Other features, aspects, and advantages of the present invention will become better understood with reference to the following description.

DETAILED DESCRIPTION OF THIS INVENTION

The present invention provides rare earth and/or transition metal doped $Ca_{1+x}Sr_{1-x}Ga_yIn_{2-y}S_zSe_{3-z}F_2$ ($0\le x\le 1$, $0\le y\le 2$, $0\le z\le 3$, particularly $0<x<1$, $0<y<2$, $0<z<3$) compounds, or alloys, that may be used for photon energy down conversion applications. The rare earth and/or transition metal impurities used as dopants/activators include, but are not limited to, Eu, Ce, Pr, Tb, Ru, Er, Mn and/or mixtures thereof. These alloys absorb photons of higher energy and emit photons of lower energy. For example, the alloy can absorb UV or blue or green wavelength photons and emit green or yellow or red wavelength photons. The absorption characteristics of the phosphor can be tuned by the chemical composition of the alloy. The emission characteristics of the phosphor can be tuned by the chemical composition of the alloy and the activator species. The quantum efficiency of the alloy is decided by the crystalline phase and the defects in the material. Defects include bulk point defects, bulk extended defects and surface defects such as dangling bonds.

The dopants/activators are present in minute quantities for emission of low energy photons by absorbing higher energy photons. Generally, the dopant is present in an amount in the range of from about 0.001 mol % to about 10 mol %. The alloy composition represented by x, y and z, the dopant species and the dopant concentrations are selected to tune the position and width of the emission peak.

Examples of alloy compositions in accordance with the present invention include, but are not limited to, $Ca_2Ga_2S_3F_2$, $CaSrGa_2SSe_2F_2$, $CaSrGaInSe_3F_2$, $CaSrGa_2S_3F_2$, $Ca_2Ga_2SSe_2F_2$, and/or mixtures thereof. In particular, $Eu^{2+}$ doped $CaSrGa_2SSe_2F_2$ with peak emission wavelength in the range of from about 540 nm to about 600 nm and $Eu^{2+}$ doped $Ca_2Ga_2SSe_2F_2$ with peak emission wavelength in the range of from about 540 to about 600 nm are preferred. An $Eu^{+2}$ doped phosphor composition having the formula $CaSrGa_2SSe_2F_2$ may have a peak emission wavelength of about 550 nm. An $Eu^{+2}$ doped phosphor having the formula $Ca_2Ga_2SSe_2F_2$ may have a peak emission wavelength of about 600 nm. The subscripts in each example represent the mole fractions of the elements present in the compound.

The use of group II, III, VI and VII elements other than Ca, Sr, Ga, In, S, Se, and F, such as Mg, Ba, Zn, Cd, Al, O, Te, Cl, and/or mixtures thereof, either result in poor quantum efficiency or high moisture sensitivity of the phosphor powder. Crucial performance characteristics of phosphors include: (a) degradation of output lumens under actual operating conditions (continuous illumination), (b) quantum efficiency at higher operating temperatures (typically encountered during LED operations), (c) shift in peak emission wavelength at operating temperature, (d) optical absorption coefficient for the higher energy photons used for excitation, (e) optical transparency of phosphor for the emission wavelength, (f) easy to handle during device fabrication and integration into passive and active structures, and (g) cost of manufactured product suitable for applications. Satisfying these stringent performance criteria requires careful optimization of the alloy composition and the synthesis process. In the present invention, we have used a multi-step synthesis process to systematically alter the compositions and study the effect of alloy composition on the quantum conversion efficiencies. It has been observed that even though the peak emission of a specific alloy system activated with a specific dopant remains the same, light emission properties such as quantum conversion efficiency, wall plug efficiency of the device, the emission peak width, the output lumens with time for continuously operated devices is dependent on the crystalline phase and/or elemental ratios in the alloy.

A method of synthesis of the composition of the present invention is also disclosed using Ca, Sr, Ga, In, S, and Se elements wherein at least one of the elements is in a fluoride compound, such as calcium fluoride (CaF), and one or more dopant impurities selected from the group consisting of rare earth metals, transition metals and/or mixtures thereof is disclosed. Synthesis methods for use in the present invention include, but are not limited to, synthesis in a single pot from a high temperature melt (liquid phase); synthesis in a single pot by solid state reaction process; and synthesis in a single pot by exposing a liquid of selected elements to the vapor of other reactant elements. Other crystalline synthesis methods as would be known by those skilled in the art may be used.

Generally, the procedure for synthesis and characterization of the disclosed phosphor class comprises the following sequential steps:

Reactants in elemental or compound form are mixed together at room temperature into a homogeneous powder form. The reactants mixed in this step depend on the process used for high temperature reaction in subsequent steps. For example, if a vapor phase reaction is used, only a sub-set of the reactants are mixed together at room temperature. The remaining reactants are mixed at high temperature from vapor phase.

Suitable reactants include, but are not limited to, elemental reactants (Ca, Ga, Sr, S, Se), compounds $Sr(OH)_2$, $SrCO_3$, $SrCl_2$, SrO, $SrF_2$, CaO, $CaF_2$, $Ga_2O_3$, $GaCl_3$, GaS, GaSe, CaS, SrS, SrSe, $EuCl_3$, $Er_2O_3$, $EuF_2$, $CeCl_3$, and/or mixtures thereof.

The homogeneous powder is reacted inside a high temperature furnace under vacuum or inert gas ambient. The ambient plays an important role on the surface chemical composition of the reacted alloy which in turn impacts the performance characteristics of the phosphor.

Reacted alloy is grounded into a fine powder and homogenized thoroughly at room temperature.

The homogeneous powder is then annealed at high temperature under vacuum or inert gas ambient. The purpose of this step is multi-fold: (a) to selectively evaporate and eliminate un-reacted species from the powder, (b) to selectively tune the surface alloy composition by decomposing a sub-set of the compounds present, (c) to homogenize the spatial chemical composition across each crystallite in the powder, (d) to grow the size of high quality crystallites from previously present nuclei, (e) to alter the crystallographic phase of the alloy, (f) to modify the morphology of the crystallites present in the powder, (g) to relieve the stress in the crystallites created during the grinding process, (h) to eliminate point and extended defects present in the crystallites, (i) to perform surface passivation of dangling bonds, and (j) to effectively activate the dopant species.

The annealed powder is then grinded finely and chemically washed to clean the surface and expose the high quality/pristine surface of the crystallites. Selection of chemicals is made to avoid degradation of the crystal structure or significant alteration of the chemical composition of the alloy. The phosphor particle/crystal extraction may use selective chemical etching solutions. Generally, the chemical etching solution has a pH in the range of from about 8 to about 12 and comprises water and a base, including but not limited to, KOH, NaOH, $NH_4OH$, and/or mixtures thereof.

The chemically treated powder is transferred to a storage medium such as an organic solution to avoid exposure to moisture and air.

The powder is dried under inert gas or vacuum or directly transferred to an epoxy mixture for fabricating the wavelength conversion device. Dried powders are also used for a variety of chemical, micro-structural and crystallographic characterizations using energy dispersive x-ray analysis (EDX), secondary electron microscopy (SEM), transmission electron microscopy (TEM), powder x-ray diffraction (XRD), surface x-ray photoelectron spectroscopy (XPS), and particle size analysis using photon correlation spectroscopy (PCS).

For the optical characterization and device fabrication, thin solid films are formed by mixing the phosphor powder with an epoxy (typically used for forming the optical dome on LED devices for light extraction) and coated on a glass plate. The epoxy-phosphor mixture is baked around 80° C. under nitrogen or argon gas flow to form a solid film.

The solid film is characterized for its optical properties. Characterization techniques include photoluminescence spectroscopy (PL) and absorption spectroscopy (ABS).

The following non-limiting examples illustrate certain aspects of the present invention.

For PC-LED characterization, wall plug efficiency is measured. FIG. 1 shows a typical PC-LED structure excited by a blue or UV LED. A blue LED (excitation wavelength: 451 nm) is used.

The examples below exemplify the role of alloy composition on the emission wavelength and final device performance. The present invention is not restricted to either wavelength range or device performance quoted herein. Compositions resulting in bluish green to red emission may be obtained by a variation of $Ca_{1+x}Sr_{1-x}Ga_yIn_{2-y}S_zSe_{3-z}F_2$ ($0 \leq x \leq 1, 0 \leq y \leq 2, 0 \leq z \leq 3$) doped with impurities such as Eu, Ce, Tb, Yb, Mn, and/or mixtures thereof.

Example 1

$Eu^{2+}$ doped $CaSrGa_2SSe_2F_2$ is synthesized by reacting pre-synthesized SrSe, GaSe, GaS, $CaF_2$, and $EuCl_3$. One mole fraction of each compound (SrSe, GaSe, GaS, $CaF_2$) is used. The $EuCl_3$ is 4 weight % of the total weight of other compounds. The mixture is reacted at a temperature of 1000° C. under argon ambient for a period of 2 hours. A yellow green luminescent ingot is obtained. The ingot is crushed into a fine powder and re-annealed at a temperature of 850° C. under hydrogen ambient for a period of 30 minutes to obtain a yellow green luminescent free flowing powder. The powder is chemically washed in a KOH-water solution (pH in the range of 9-10) and dried with nitrogen gas. The PL spectrum of the phosphor is shown in FIG. 2a (solid curve). The powder XRD of the phosphor is shown in FIG. 3. The wall plug efficiency of the PC-LED fabricated using the dried powder and excited by blue LED (451 nm) is measured to be about 117-121 lumens/watt.

Example 2

To demonstrate the peak emission tunability of the alloy composition of the present invention as a function of elemental ratios, $Eu^{2+}$ doped $Ca_2Ga_2SSe_2F_2$ is synthesized by reacting pre-synthesized CaS, GaSe, $CaF_2$, and $EuCl_3$. One mole fraction of each compound CaS and $CaF_2$ is taken. Two mole fractions of GaSe are used. The $EuCl_3$ is 4 weight % of the total weight of other compounds. The mixture is reacted at a temperature of 1000° C. under argon ambient for a period of 2 hours. A yellow orange luminescent ingot is obtained. The ingot is crushed into a fine powder and re-annealed at a temperature of 850° C. under hydrogen ambient for a period of 30 minutes to obtain a yellow orange luminescent free flowing powder. The powder is chemically washed in a KOH-water solution (pH in the range of 9-10) and dried with nitrogen gas. The PL spectrum of the phosphor is shown in FIG. 2a (dashed curve).

Example 3

$Eu^{2+}$ doped $CaSrGa_2S_3F_2$ is synthesized by reacting pre-synthesized $SrS:Eu^{2+}$, GaS and $CaF_2$. One mole fraction of $SrS:Eu^{2+}$ and $CaF_2$ and eight moles (excess) of GaS are used. The $Eu^{2+}$ is 2 weight % of the total weight of SrS in the synthesized compound. The mixture is reacted at a temperature of 900° C. under argon ambient for a period of 48 hours, followed by reacting at 1050° C. for 12 hours. The reaction mixture is cooled slowly at a rate of 2° C. per hour to a temperature of 950° C., followed by a rapid cooling cycle to room temperature at a rate of 50° C. per hour. Crystallites of green luminescence are obtained embedded in excess of GaS. The crystallites are extracted by washing the reacted mixture in KOH-water mixture (pH: 10-11) for a period of 12 hours. The extracted crystallites are crushed into a fine powder and re-annealed at a temperature of 900° C. under argon ambient for a period of 12 hours to obtain a green luminescent free flowing powder. The PL spectrum of the phosphor exhibits a broad peak around 530 nm when excited by a blue LED (451 nm) as shown in FIG. 2b.

Example 4

$Eu^{2+}$ doped $Ca_{1.5}Sr_{0.5}Ga_2S_3F_2$ is synthesized by reacting pre-synthesized $SrS:Eu^{2+}$, $CaS:Eu^{2+}$, GaS and $CaF_2$. One mole fraction of $CaS:Eu^{2+}$ and $CaF_2$, one-half mole fraction of $SrS:Eu^{2+}$ and eight moles (excess) of GaS are used. The $Eu^{2+}$ is 2 weight % of the total weight of SrS and CaS in the synthesized compound. The mixture is reacted at a temperature of 850° C. under argon ambient for a period of 48 hours, followed by reacting at 950° C. for 24 hours. The reaction mixture is cooled slowly at a rate of 2° C. per hour to a temperature of 900° C., followed by a rapid cooling cycle to room temperature at a rate of 50° C. per hour. Crystallites of greenish yellow luminescence are obtained embedded in excess of GaS. The crystallites are extracted by washing the reacted mixture in mild KOH-water mixture (pH: 8-9) for a period of 36 hours. The extracted crystallites are crushed into a fine powder and re-annealed at a temperature of 850° C. under argon ambient for a period of 24 hours to obtain a greenish yellow luminescent free flowing powder. The PL spectrum of the phosphor exhibits a broad peak around 545 nm when excited by a blue LED (451 nm) as shown in FIG. 2c.

Example 5

$Eu^{2+}$ doped $Ca_2Ga_2S_3F_2$ is synthesized by reacting pre-synthesized $CaS:Eu^{2+}$, GaS and $CaF_2$. One mole fraction of $CaS:Eu^{2+}$ and $CaF_2$ and two moles of GaS are used. The $Eu^{2+}$ is 2 weight % of the total weight of CaS. The mixture is reacted at a temperature of 1000° C. under argon ambient for a period of 24 hours. Large particulates of yellow luminescence are obtained. The particulates are crushed into a fine powder and re-annealed at a temperature of 850° C. under argon ambient for a period of 12 hours to obtain a yellow luminescent free flowing powder. The PL spectrum of the phosphor exhibited a broad peak around 555 nm when excited by a blue LED (451 nm) as shown in FIG. 2d.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the above described invention.

The invention claimed is:

1. A phosphor composition having the formula $Ca_{1+x}Sr_{1-x}Ga_yIn_{2-y}S_zSe_{3-z}F_2$:D, wherein $0 \leq x \leq 1$, $0 \leq y \leq 2$ and $0 \leq z \leq 3$ and wherein D is a dopant comprising one or more rare earth and transition metal elements.

2. A phosphor composition having the formula $Ca_{1+x}Sr_{1-x}Ga_yIn_{2-y}S_zSe_{3-z}F_2$:D, wherein $0 \leq x \leq 1$, $0 \leq y \leq 2$ and $0 \leq z \leq 3$ and wherein D is a dopant comprising one or more rare earth and transition metal elements.

3. A phosphor composition according to claim 1 wherein the one or more rare earth and transition metal elements are selected from the group consisting of Eu, Ce, Pr, Tb, Ru, Er, Mn and/or mixtures thereof.

4. A phosphor composition according to claim 1 having the formula $Ca_2Ga_2S_3F_2$:D.

5. A phosphor composition according to claim 1 having the formula $CaSrGa_2SSe_2F_2$:D.

6. A phosphor composition according to claim 1 having the formula $CaSrGaInSe_3F_2$:D.

7. A phosphor composition according to claim 1 having the formula $CaSrGa_2S_3F_2$:D.

8. A phosphor composition according to claim 1 having the formula $Ca_2Ga_2SSe_2F_2$:D.

9. A phosphor composition according to claim 1 having the formula $CaSrGa_2SSe_2F_2$:$Eu^{2+}$ with a peak emission wavelength of about 550 nm.

10. A phosphor composition according to claim 1 having the formula $CaSrGa_2S_3F_2$:$Eu^{2+}$ with a peak emission wavelength of about 530 nm.

11. A phosphor composition according to claim 1 $Ca_{1.5}Sr_{0.5}Ga_2S_3F_2$:$Eu^{2+}$ with a peak emission wavelength of about 545 nm.

12. A phosphor composition according to claim 1 $Ca_2Ga_2S_3F_2$:$Eu^{2+}$ with a peak emission wavelength of about 555 nm.

13. A composition according to claim 1 $Ca_2Ga_2SSe_2F_2$:$Eu^{+2}$ with peak emission wavelength of about 600 nm.

* * * * *

UNITED STATES PATENT AND TRADEMARK OFFICE
CERTIFICATE OF CORRECTION

| | | |
|---|---|---|
| PATENT NO. | : 8,974,695 B2 | Page 1 of 1 |
| APPLICATION NO. | : 13/293581 | |
| DATED | : March 10, 2015 | |
| INVENTOR(S) | : Partha S. Dutta | |

It is certified that error appears in the above-identified patent and that said Letters Patent is hereby corrected as shown below:

On the Title Page, Item (54) and in the Specification, column 1, line 3, insert --methods of-- before "manufacturing."

Signed and Sealed this
Seventh Day of July, 2015

Michelle K. Lee
*Director of the United States Patent and Trademark Office*